United States Patent
Brooks et al.

(10) Patent No.: US 9,230,083 B2
(45) Date of Patent: *Jan. 5, 2016

(54) SECURING APPLICATION INFORMATION IN SYSTEM-WIDE SEARCH ENGINES

(71) Applicant: International Business Machines Corporation, Armonk, NY (US)

(72) Inventors: David A. Brooks, Providence, RI (US); David Konopnicki, Haifa (IL); Laurent D. Hasson, New York, NY (US); Igor L. Belakovskiy, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,189

(22) Filed: Nov. 30, 2014

(65) Prior Publication Data

US 2015/0088854 A1   Mar. 26, 2015

Related U.S. Application Data

(63) Continuation of application No. 11/462,937, filed on Aug. 7, 2006, now Pat. No. 8,938,474.

(51) Int. Cl.
   *G06F 21/33*   (2013.01)
   *G06F 17/30*   (2006.01)

(52) U.S. Cl.
   CPC .......... *G06F 21/33* (2013.01); *G06F 17/30613* (2013.01); *G06F 17/30631* (2013.01); *G06F 17/30867* (2013.01)

(58) Field of Classification Search
   CPC ................................................ G06F 17/30631
   See application file for complete search history.

(56) References Cited

U.S. PATENT DOCUMENTS

| | | |
|---|---|---|
| 5,305,456 A | 4/1994 | Boitana |
| 5,924,102 A | 7/1999 | Perks |
| 7,356,840 B1 | 4/2008 | Bedell et al. |
| 2004/0267730 A1 | 12/2004 | Dumais et al. |
| 2005/0021508 A1 | 1/2005 | Matsubayashi et al. |
| 2005/0076023 A1 | 4/2005 | Wu et al. |
| 2005/0138110 A1 | 6/2005 | Redlich et al. |
| 2006/0041891 A1 | 2/2006 | Aaron |
| 2006/0053097 A1 | 3/2006 | King et al. |
| 2006/0059154 A1 | 3/2006 | Raab |
| 2007/0005581 A1 | 1/2007 | Arrouye et al. |

OTHER PUBLICATIONS

Microsoft I Filter API: http://msdn.microsoft.com/library/default.asp?url=/library/en-us/indexsrv/html/ixufilt_912d.asp, Jun. 8, 2006.
http://desktop.google.com/developer.html, Jun. 8, 2006.
http://www-306.ibm.com/software/data/integration/db2ii/features_womnifind.html, Jun. 8, 2006.

*Primary Examiner* — Fred I Ehichioya
*Assistant Examiner* — Kris Mackes
(74) *Attorney, Agent, or Firm* — BainwoodHuang

(57) ABSTRACT

Securing application information in a shared, system-wide search service, in which each application can register a security filtering module that is to be used at search time to filter data associated with that application. Initial, unfiltered search results are obtained based on the contents of the shared search index, and are organized by application. Previously registered filter modules are called to perform user specific, per-application filtering on the initial results, such that data to which the user issuing the search request does not have access is removed from the search results, resulting in a set of filtered search results that are presented to the user and that contain indications only of data that is accessible to the user.

18 Claims, 5 Drawing Sheets

SECURING APPLICATION INFORMATION IN SYSTEM-WIDE SEARCH ENGINES

FIELD OF THE INVENTION

The present invention relates generally to search indexes, and more specifically to a method and system for securing application information for multiple applications and users in a system-wide search engine.

BACKGROUND OF THE INVENTION

In order to improve performance of operations such as searches, sorts, and others, it is often useful to create and maintain a search index data structure. A search index enables efficient matching of tokens within a search query to documents containing those tokens. For the contents of a document to be represented in a search index, the document must go through an indexing step, resulting in information describing the document contents being added to the index.

As search services become foundation services provided on a desktop (e.g. Google™ Desktop Search), or as part of the underlying operating system itself (e.g. Microsoft® Windows®), it becomes natural that applications not implement their own search features, but instead index their data using a shared, system-wide index. For example, a messaging application that provides a searchable history of messages might not implement its own search index, but instead could simply be designed to push or otherwise make messages it desires to be indexed available to a shared, global index.

In order to support search indexes that are shared across multiple applications, providers of existing search technologies are publishing APIs (Application Programming Interfaces) that allow applications to push their data into the index. One example of such an approach is found in the Microsoft IFilter API. This API is used by the Microsoft Windows operating system to make various file types searchable by a service that is part of the operating system. To make files of a specific type searchable, applications must implement a specific interface, create an indexing filter, and register the indexing filter for a specific file extension. When the service detects a new file or a change in a file, it loads the indexing filter associated with the file type and uses it to index the content of the file.

Another example of an existing search technology API is found in the Google Desktop SDK (System Developer's Kit). This API has two flavors: 1) an API similar to the Microsoft IFilter API, through which applications register indexing filters for corresponding file types, and the indexer uses the specific indexing filter when a file of the corresponding type is indexed in a pull operation, and 2) an API that allows applications to push data directly into the index.

A significant shortcoming exists in these existing solutions, since they operate at indexing time only, and accordingly are limited with respect to providing security. Specifically, these systems are inadequate when a centralized search index may contain data on behalf of several different users. In that case, there is a need for a search service that processes search results so that results are only presented to a user if that user has access to the corresponding data. Moreover, since security logic usually belongs to the application from which the data was indexed in the first place, appropriate search result filtering cannot be performed by existing systems, since they do not provide a mechanism for accessing each application's security logic at search time.

Other existing technology has provided security with regard to a specific type of content. In IBM® Websphere Portal, a security model has been used based on Portal Access Control with regard to Portal Pages that are indexed. This type of approach, although providing an index with secured data, is restricted to using only one security mechanism (Portal Access Control) and only one content type (Portal Pages). A system-level search service should instead provide an extensible framework in which multiple applications can conveniently introduce new content types and new security mechanisms for such new content types.

For the above reasons and others, it would be desirable to have a new system for securing application information in a shared, system-wide search service.

SUMMARY OF THE INVENTION

To address the above described and other shortcomings of prior solutions, a new method and system are disclosed for securing application information in a shared, system-wide search service. In the disclosed system, each application can register a security filtering module that is to be used at search time to filter data associated with that application, based access rights of the user issuing the search, as defined by the application.

When a user performs a search, initial, unfiltered search results are obtained based the query and all the contents of the shared search index. The unfiltered search results are organized by application, such that those search results indicating data passed to the index from Application A are grouped together, those search results indicating data passed to the index from Application B are grouped together, and so on.

After the initial search results are obtained, one or more previously registered filter modules are called to perform user specific, per-application access filtering. The filtering performed by the filter modules causes data to which the user issuing the search request does not have access to be removed from the initial search results, on a per application basis. Thus the filter registered for Application A determines which of the initial search results associated with Application A are accessible to the user, the filter registered for Application B determines which of the initial search results associated with Application B are accessible to the user, and so on. Those of the initial search results that are determined to not be accessible to the user issuing the search request are removed, resulting in a set of filtered search results that may be displayed or otherwise delivered to the user. The filtered search results thus contain indications only of data that is accessible to the user. In this way, the system-wide search service filters search results to remove indications of data which match the search criteria provided by the user, but to which the user does not have access, based on a conveniently extensible, per-application search result filtering process.

The disclosed system can securely index and search information that is relevant to multiple users. By allowing registration of external security mechanisms, an extensible search service is provided enabling new applications to participate in both the indexing of their content and the filtering of search results based on individual user's security credentials. Secure filtering is provided as part of a core search engine that allows existing search interfaces to return secure search results for new applications, without prior knowledge of the design or existence of the new applications.

BRIEF DESCRIPTION OF THE DRAWINGS

In order to facilitate a fuller understanding of the present invention, reference is now made to the appended drawings.

These drawings should not be construed as limiting the present invention, but are intended to be exemplary only.

DETAILED DESCRIPTION OF EXEMPLARY EMBODIMENTS

Figure 1:
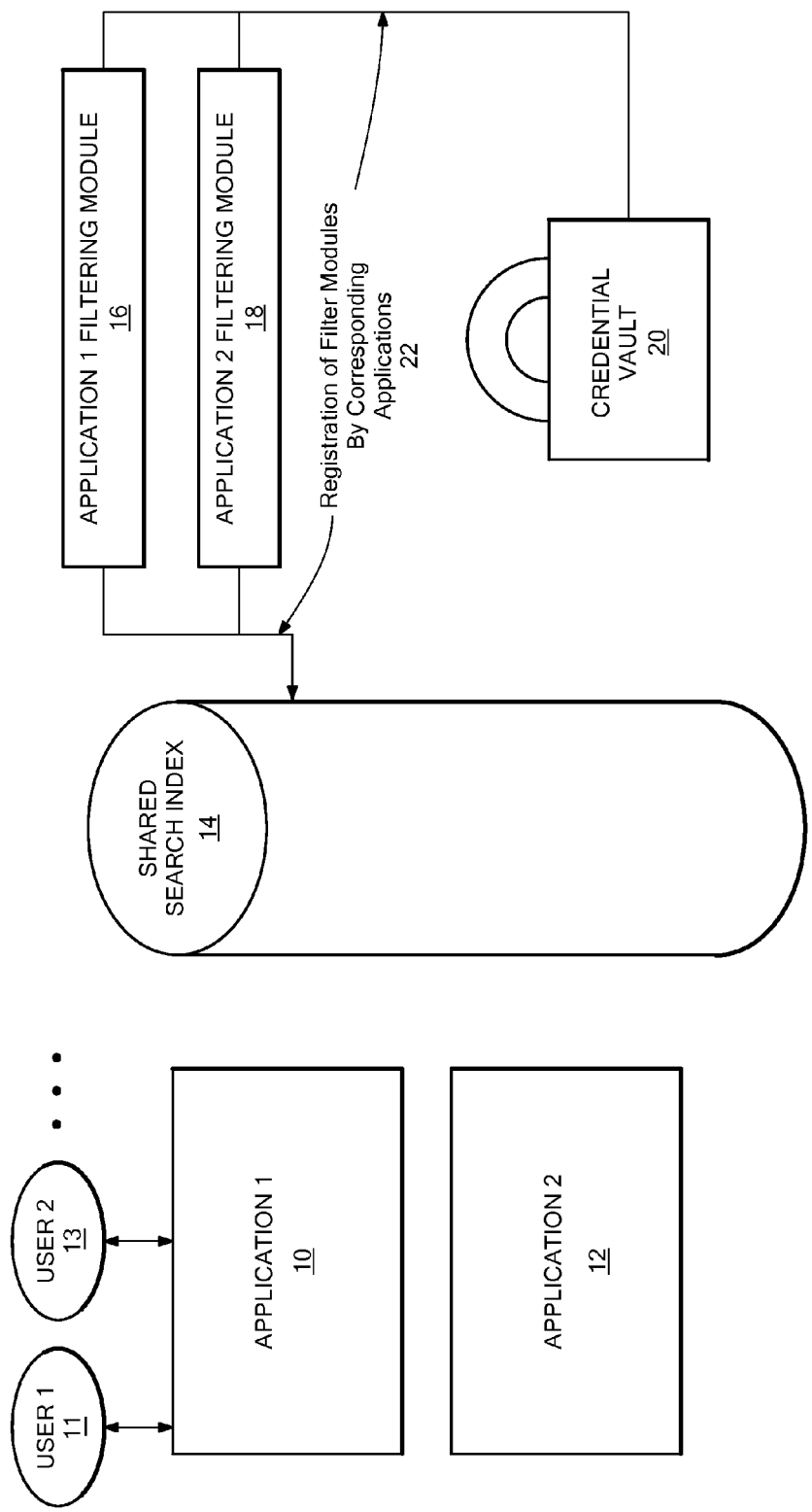
FIG. 1 is a block diagram showing registration performed by components in an illustrative embodiment of the disclosed system.

As shown in FIG. 1, an illustrative embodiment of the disclosed system includes a Shared Search Index 14 that is shared by multiple computer application programs, show for purposes of illustration as including an Application 1 10 and an Application 2 12. Each of the applications sharing the Shared Search Index 14 may further have multiple users, shown for purposes of illustration by User 1 11 and User 2 13 of Application 1 10. The applications sharing the Shared Search Index 14 may include any specific kind or type of computer application program, such as communications programs including electronic mail, instant messaging, and the like, document editing programs such as word processors, text or video editors and the like, and/or any other specific kind of application program that manipulates computer data during its operation.

During operation of the components shown in FIG. 1, each of the applications sharing the Shared Search Index 14 and requiring security filtering on search results registers 22 a corresponding security filtering software module, shown for purposes of illustration by the Application 1 Filtering Module 16 and the Application 2 Filtering Module 18. The Application 1 Filtering Module 16 corresponds to Application 1 10, and is registered by Application 1 10, and the Application 2 Filtering Module 18 corresponds to Application 2 12, and is registered by Application 2 12.

Registration 22 of a security filtering module causes that security filtering module to be associated with the application that registered it. Accordingly, when Application 1 Filtering Module 16 is registered by Application 1 10 the result is an association between Application 1 Filtering Module 16 and Application 1 10, and when Application 2 Filtering Module 18 is registered by Application 2 12, the result is an association between Application 2 Filtering Module 18 and Application 2 12. The association between an application and the corresponding security filtering module is known by or stored within the Shared Search Index 14 in any appropriate type of data structure, such as, for example, a table or the like.

Each application using the Shared Search Index 14 may use a credential system provided in the underlying execution platform, support a form of single sign-on, or some alternative credential system that does not support single sign-on. Authentication credentials for any of these approaches may be stored in and retrieved from a credential store such as the Credential Vault 20 shown in FIG. 1.

In one embodiment, security filtering modules that use independent, application specific authentication systems are permitted to extend an underlying execution platform's authentication mechanism. Mappings between the identity of a user logged in to the underlying execution platform and application specific authentication credentials for that user may accordingly be established to be used by individual security filtering modules. Such mappings enable the individual security filtering modules to associate a currently logged in user that has been authenticated by the underlying application platform with application specific credentials for that user. The security filtering module can then use the application specific credentials to obtain access information describing which documents associated with the corresponding application the user has access to. For example, the User ID of the user for the underlying platform can be mapped to previously stored credentials for an application. In order to obtain application specific credentials that have not previously been stored, user name and password prompts or the like may generated to the user for each application for which credentials have not yet been obtained for that user. Such mapping information that maps a currently logged in user to application specific credentials may, for example, be stored at registration time 22 with the application specific credentials in the Credential Vault 20, and subsequently be retrieved by individual security filtering modules when filtering search results.

The application programs sharing the Shared Search Index 14, the Shared Search Index 14, the application filtering modules 16 and 18, and the Credential Vault 20, may each be embodied as program code stored in and executing on one or more computer systems, each of which may, for example, include at least one processor, program storage, such as memory, for storing program code executable on the processor, and one or more input/output devices and/or interfaces, such as data communication and/or peripheral devices and/or interfaces, as well as appropriate operating system software.

While for purposes of clear illustration and concise explanation FIG. 1 shows only two applications sharing the Shared Search Index 14, and two corresponding security filtering modules 16 and 18, the disclosed system is not so limited, and those skilled in the art will recognize that there may be any specific number of applications sharing the Shared Search Index 14, each of which may have a corresponding security filtering module.

Figure 2:
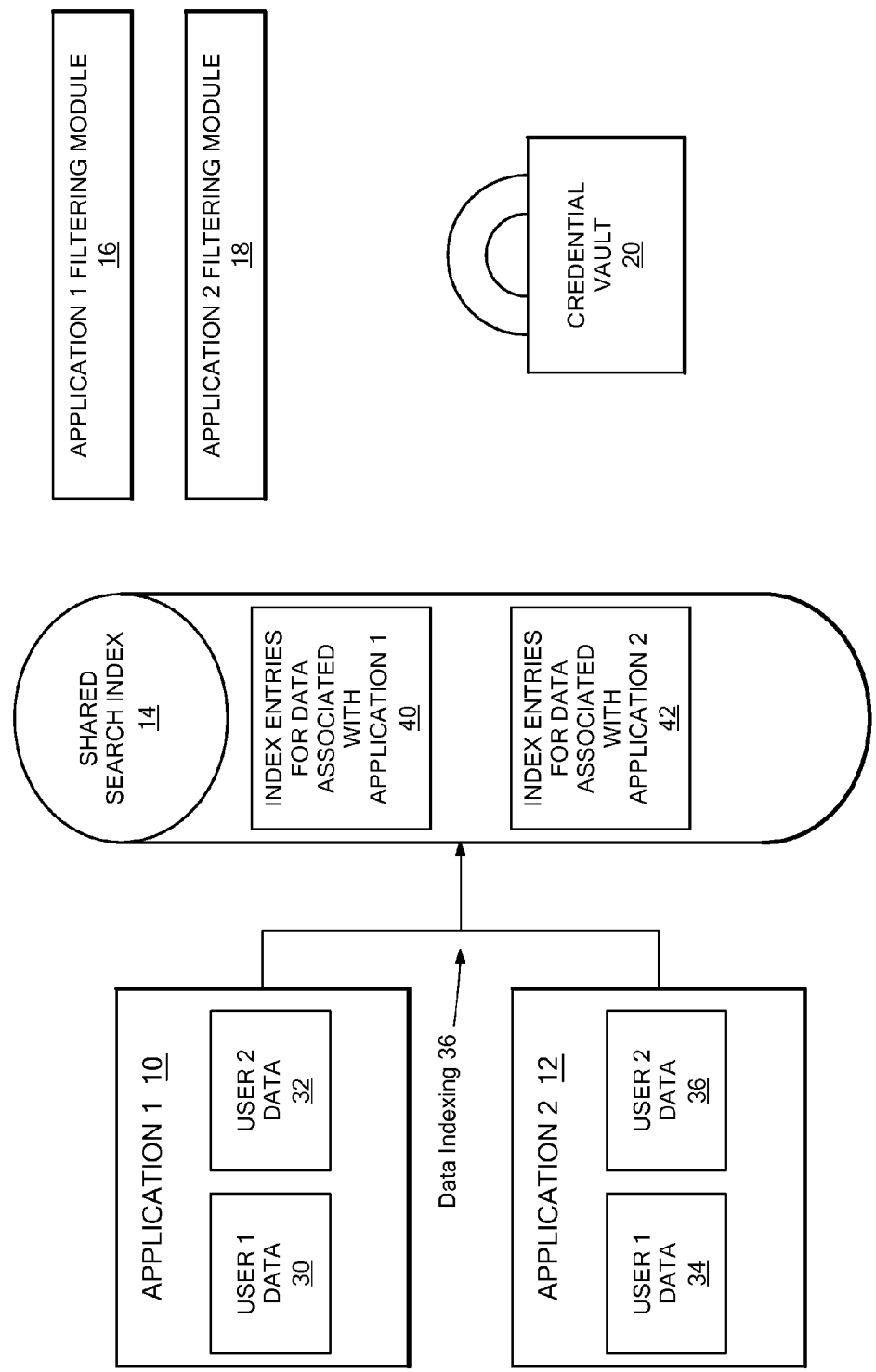
FIG. 2 is a block diagram showing indexing performed by components in an illustrative embodiment of the disclosed system.

FIG. 2 shows data indexing 36 performed in an illustrative embodiment. As shown in FIG. 2, each of the applications sharing the Shared Search Index 14 causes documents accessible to different users to be indexed into the Shared Search Index 14. The index information stored in the Shared Search Index 14 associates documents and the applications from which they were obtained. Accordingly, those documents originating from Application 1 10 are described in the Shared Search Index 14 by Index Entries for Data Associated with Application 1 40, while those documents originating from Application 2 12 are described in the Shared Search Index 14 by Index Entries for Data Associated with Application 2 42. Accordingly, when the Shared Search Index 14 is subsequently used during a search operation, each document matching the search criteria can be associated with the application from which it originated.

Documents may be obtained from applications through either push or pull models. For example, in a push model, documents are passed to the Shared Search Index 14 by individual applications through an API provided for this purpose. Alternatively, in a pull model, a process sometimes referred to as a "crawler" operates on behalf of the Shared Search Index 14 to automatically index ("crawl") through the documents associated with all the applications.

Figure 3:
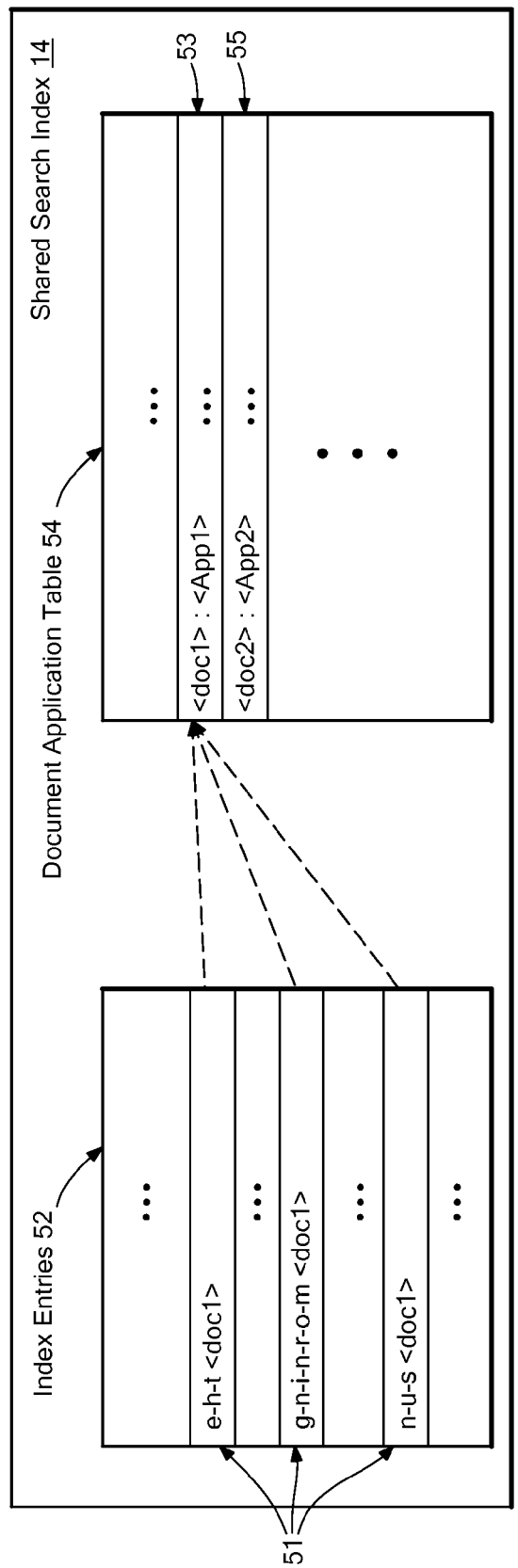
FIG. 3 is a block diagram showing an illustrative embodiment of a search index.

FIG. 3 shows a format of the Shared Search Index 14. In the example of FIG. 3, the Shared Search Index 14 is shown including Index Entries 52. The Index Entries 52 in FIG. 3 are an example of a search index data structure that enables efficient text searching across the documents indexed during the data indexing 36 of FIG. 3. The Index Entries 52 may make up or form part of what is sometimes referred to by computer scientists as a "trie", from the word "retrieval". While the disclosed system may be embodied using a trie data structure, it is not limited to such an embodiment, and any other specific type or structure may be used for the Shared Search Index 14.

FIG. 3 shows an example of how a document ("doc1") can be associated with an application from which that document was obtained ("App1") through the Shared Search Index 14. For purposes of explanation, the document "doc1" includes the text "The Morning Sun". The index entries 51 indicate that the words "the", "morning" and "sun" are contained in "doc1", by way of the document tag "<doc1>" contained in each of the entries 51. As in one conventional practice, matching of text strings in the index entries 52 is done in reverse character order; "the" is therefore matched by the entry containing "e-h-t", "morning" by "g-n-i-n-r-o-m", etc. The entries 51 in index entries 52 representing the contents of the document "doc1" may further include indications, pointers or links describing where "doc1" is stored, so that such information can be provided in search results for search queries matching the contents of "doc1". Other information, reflecting frequency of occurrence or location of words within the "doc1", may further be included within the entries 51.

The index entries 51 are all associated with an entry 53 for "doc1" in the Document Application Table 54. Entry 53 indicates that "doc1" was obtained from an application "App1" by way of the tag "<App1>" that it contains. Those of entries 52 describing the contents of another document "doc2" might indicate the entry 55 in the Document Application Table 54, where the entry 55 indicates that "doc2" was obtained from an application "App2" by way of the tag "<App2>" that entry 55 contains.

Figure 4:
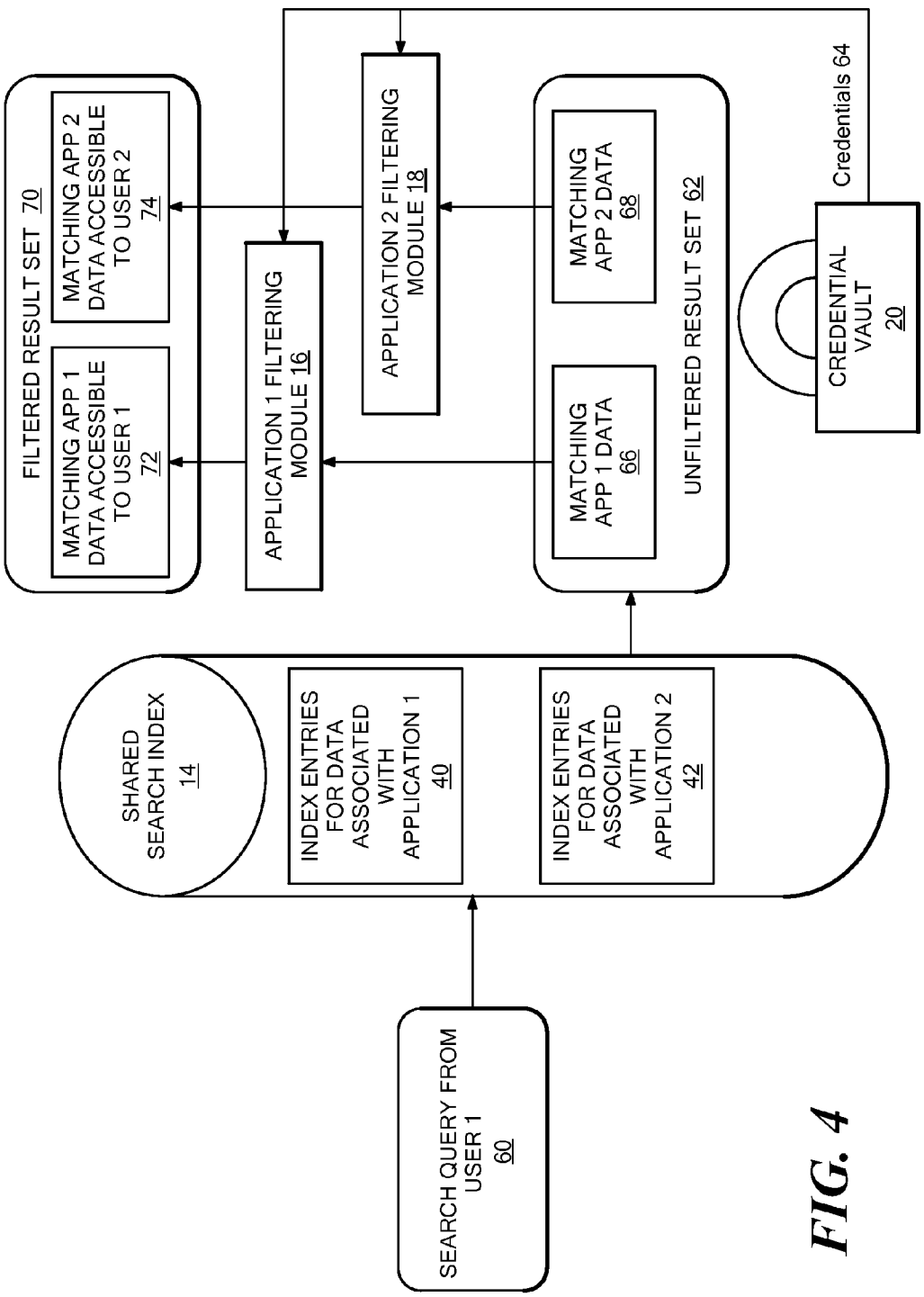
FIG. 4 is a block diagram showing search query processing by components in an illustrative embodiment of the disclosed system.

FIG. 4 shows operation of an illustrative embodiment in response to receipt of a Search Query 60 from User 1 11 (FIG. 1). As shown in FIG. 4, an Unfiltered Result Set 62 is initially generated that contains indications of all documents obtained from any application that match the Search Query 60, regardless of whether the indicated documents are accessible to User 1 11. The Unfiltered Result Set 62 may be organized such that all search results indicating documents obtained from a given application are grouped together or otherwise associated with each other. For purposes of illustration, in FIG. 4 the Unfiltered Result Set 62 is shown including Matching Application 1 Data 66 and Matching Application 2 Data 68. The Matching Application 1 Data 66 indicates all documents obtained by the Shared Search Index 14 from Application 1 10 (FIG. 1) and matching the Search Query 60, while the Matching Application 2 Data 68 indicates all documents obtained by the Shared Search Index 14 from Application 2 12 (FIG. 1) and matching the Search Query 60.

FIG. 4 further illustrates how application specific security filtering modules are applied for each application that shares the Shared Search Index 14 in one embodiment of the disclosed system. FIG. 4 also shows that only the search results indicating documents obtained from a given application need to be passed to the security filtering module associated with that application. As shown in FIG. 4, the Matching Application 1 Data 66 is passed to the Application 1 Filtering Module 16. The Application 1 Filtering Module 16 obtains any credentials needed to authenticate User 1 11 with Application 1 10 from the Credential Vault 20, as part of the Credentials 64. The Application 1 Filtering Module 16 then uses such credentials to authenticate User 1 11 through any authentication system that may be used by Application 1 10. The Application 1 Filtering Module 16 then determines which of the documents indicated by the Matching Application 1 Data 66 can be accessed by User 1 11, and removes indications of any documents that User 1 11 cannot access from the Matching Application 1 Data 66. The result is the Matching Application 1 Data Accessible to User 1 72 in the Filtered Results Set 70. The Matching Application 1 Data Accessible to User 1 72 thus contains only indications of those documents obtained by the Shared Search Index 14 for indexing from the Application 1 10 that match the Search Query 60, and that are accessible to User 1 11. The determination of which documents of the documents obtained from Application 1 10 and matching the Search Query 60 that are accessible to User 1 11 is made by the Application 1 Filtering Module 16 based on the access rights for User 1 11 as defined by Application 1 10, which had previously registered Application 1 Filtering Module 16 for this purpose.

Similarly, the Matching Application 2 Data 68 is passed to the Application 2 Filtering Module 18. The Application 2 Filtering Module 18 obtains any credentials needed to authenticate User 1 11 with Application 2 12 from the Credential Vault 20, as part of the Credentials 64. The Application 2 Filtering Module 18 then uses such credentials to authenticate User 1 11 through any authentication system that may be used by Application 2 12. The Application 2 Filtering Module 18 then determines which of the documents indicated by the Matching Application 2 Data 68 can be accessed by User 1 11, and removes any documents that User 1 11 cannot access from the Matching Application 2 Data 68. The result is the Matching Application 2 Data Accessible to User 1 74 in the Filtered Results Set 70. The Matching Application 2 Data Accessible to User 1 74 thus contains only indications of those documents obtained by the Shared Search Index 14 for indexing from the Application 2 12 that match the Search Query 60, and that are accessible to User 1 11. The determination of which documents of the documents obtained from Application 2 12 and matching the Search Query 60 that are accessible to User 1 11 is made by the Application 2 Filtering Module 18 based on the access rights for User 1 11 as defined by Application 2 12, which had previously registered Application 2 Filtering Module 18 for this purpose.

As a result of the above described operations of the Application 1 Filtering Module 16 and the Application 2 Filtering Module 18, the Filtered Results Set 70 can be displayed to User 1 11 without displaying any indications of documents to which User 1 11 does not have access.

In one embodiment, the interface for each security filtering module provides a method similar to bitset[ ] hasAccess (Userinfo, DocumentId[ ]), where UserInfo provides enough information to the module so that the module can use an underlying execution platform's User-ID for the user, a Lightweight Third-Party Authentication (LTPA) token for single sign-on operation, or perform a mapping to a different, application specific User-ID from the Credential Vault 20. The list DocumentId[ ] contains all the documents in the initial search results that are associated with the corresponding application, and the returned bitset[ ] contains corresponding bits having values indicating those of the documents in DocumentId[ ] to which the user issuing the search request has access.

Figure 5:
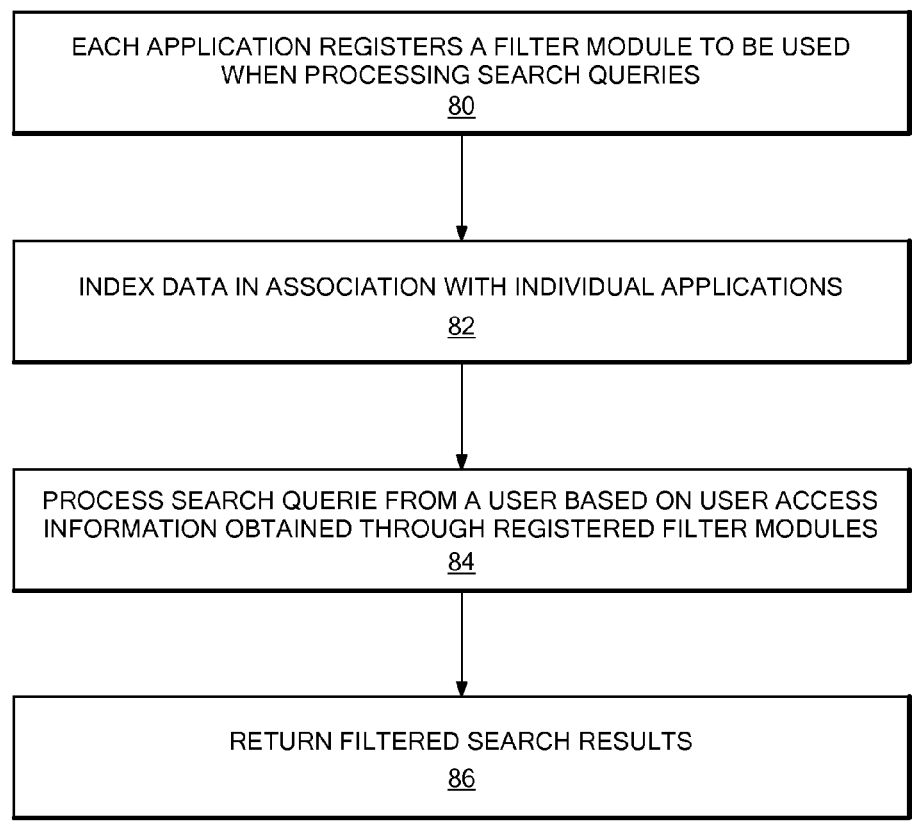
FIG. 5 is a flow chart showing steps performed in an illustrative embodiment of the disclosed system.

FIG. 5 is a flow chart showing steps performed in an illustrative embodiment of the disclosed system. As shown in FIG. 5, at step 80 each application registers a security filtering module to be used when processing search queries. In one embodiment, step 80 is performed for each application when that application is initially installed. At step 82, data is obtained from individual applications sharing a shared search index, and indexed such that the index information stored in the shared search index associates individual documents with the applications from which they were originally obtained to be indexed. As mentioned above, documents may be obtained for indexing by the shared search index through either a pull model, which uses a "crawler" process to pull documents into the shared search index for indexing, or through a push model, in which the individual applications explicitly pass documents to the shared search index for indexing.

At step 84, the disclosed system processes a search query obtained from a user based on per-application user access information applied through the registered security filtering modules corresponding to each application. For example, a set of initial search results that include all documents matching the search query, and potentially organized by originating application, may be filtered by the registered security filtering modules to remove those documents from the search results to which the user does not have access based on per-application user access rights. After application of the registered security filtering modules at step 84, at step 86 filtered search results can be returned and displayed that do not contain any indications of documents to which the user that requested the search does not have access.

The disclosed system results in a number of specific advantages over prior solutions. One noteworthy advantage of the disclosed system is that it is a secure, platform-wide full text search framework that is extensible, in that it supports dynamic registration of additional application-specific security filtering modules.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method comprising:

obtaining data to be indexed from each of a plurality of applications, wherein said obtaining includes receiving a plurality of documents pushed by individual ones of a plurality of applications through an application programming interface of a shared search service;

indexing said data into a shared search index of said secure, shared search service, wherein said indexing includes storing, for each one of said documents pushed through said application programming interface, in an entry representing said document in an application table within said shared search index, a tag identifying which one of said applications pushed said document through said application specific programming interface, and wherein said indexing further includes storing, for each word in said data, in an index entry for said word, an indication of an entry in said application table representing one of said documents containing said word, and wherein said shared search index is shared across said plurality of applications and a plurality of users;

receiving a search query from one of said users;

obtaining, responsive to said search query and said index entries, unfiltered initial search results including all documents matching said search query;

storing said initial search results prior to displaying any of said initial search results;

determining, prior to displaying any of said initial search results, and responsive to said initial search results, said index entries and said document table in said shared search index, for each document in said initial search results, which one of said plurality of applications pushed said document through said application programming interface of said shared search service;

organizing documents in said initial search results, prior to displaying any of said initial search results, into groups reflecting which of said plurality of applications pushed each document through said application programming interface of said shared search service;

determining, for each document in said initial search results, prior to displaying any of said initial search results, one of a plurality of security filtering modules registered by a corresponding one of said plurality of applications that pushed said document through said application programming interface of said shared search service to be indexed;

applying, prior to displaying any of said initial search results, security filtering modules registered by individual ones of said plurality of applications that pushed said documents in said initial search results through said application programming interface to said initial search results to obtain filtered search results, wherein said applying includes said security filtering modules removing documents from said initial search results to which said one of said users does not have access, and performs application specific security filtering on a document by document basis within said initial search results by individually applying individual ones of said security filtering modules to only those documents of said initial search results pushed through said application programming interface of said search service by corresponding ones of said applications that registered said security filtering modules; and displaying said filtered search results.

2. The method of claim 1, further comprising:

storing credential mapping information regarding said one of said users, wherein said credential mapping information maps said one of said users to application specific authentication credentials for one of said applications;

said applying said security filtering modules further comprising retrieving said application specific authentication credentials, responsive to said credential mapping information, by one of said security filtering modules corresponding to said one of said applications; and said applying said security filtering modules further comprising determining which documents obtained from said one of said applications to which said one of said users does not have access responsive to said application specific authentication credentials.

3. The method of claim 2, further comprising:

registering security filtering modules for each of said applications when each of said applications are installed.

4. The method of claim 1, wherein said plurality of applications comprise an electronic mail program.

5. The method of claim 1, wherein said plurality of applications comprise an instant messaging program.

6. The method of claim 1, wherein said plurality of applications comprise a document editing program.

7. A system, comprising:

at least one processor and at least one computer readable memory, said computer readable memory have program code stored thereon for execution on said at least one processor, said program code comprising program code for obtaining data to be indexed from each of a plurality of applications, wherein said obtaining includes receiving a plurality of documents pushed by individual ones of a plurality of applications through an application programming interface of a shared search service;

program code for indexing said data into a shared search index of said secure, shared search service, wherein said indexing includes storing, for each one of said documents pushed through said application programming interface, in an entry representing said document in an application table within said shared search index, a tag identifying which one of said applications pushed said document through said application specific programming interface, and wherein said indexing further includes storing, for each word in said data, in an index entry for said word, an indication of an entry in said application table representing one of said documents containing said word, and wherein said shared search index is shared across said plurality of applications and a plurality of users;

program code for receiving a search query from one of said users;

program code for obtaining, responsive to said search query and said index entries, unfiltered initial search results including all documents matching said search query;

program code for storing said initial search results prior to displaying any of said initial search results;

program code for determining, prior to displaying any of said initial search results, and responsive to said initial search results, said index entries and said document table in said shared search index, for each document in said initial search results, which one of said plurality of applications pushed said document through said application programming interface of said shared search service;

program code for organizing documents in said initial search results, prior to displaying any of said initial search results, into groups reflecting which of said plurality of applications pushed each document through said application programming interface of said shared search service;

program code for determining, for each document in said initial search results, prior to displaying any of said initial search results, one of a plurality of security filtering modules registered by a corresponding one of said plurality of applications that pushed said document through said application programming interface of said shared search service to be indexed;

program code for applying, prior to displaying any of said initial search results, security filtering modules registered by individual ones of said plurality of applications that pushed said documents in said initial search results through said application programming interface to said initial search results to obtain filtered search results, wherein said applying includes said security filtering modules removing documents from said initial search results to which said one of said users does not have access, and performs application specific security filtering on a document by document basis within said initial search results by individually applying individual ones of said security filtering modules to only those documents of said initial search results pushed through said application programming interface of said search service by corresponding ones of said applications that registered said security filtering modules; and program code for displaying said filtered search results.

8. The system of claim 7, said program code further comprising:

program code for storing credential mapping information regarding said one of said users, wherein said credential mapping information maps said one of said users to application specific authentication credentials for one of said applications;

wherein said program code for applying said security filtering modules further comprises program code for retrieving said application specific authentication credentials, responsive to said credential mapping information, by one of said security filtering modules corresponding to said one of said applications; and wherein said program code for applying said security filtering modules further comprises program code for determining which documents obtained from said one of said applications to which said one of said users does not have access responsive to said application specific authentication credentials.

9. The system of claim 8, said program code further comprising:

program code for registering security filtering modules for each of said applications when each of said applications are installed.

10. The system of claim 7, wherein said plurality of applications comprise an electronic mail program.

11. The system of claim 7, wherein said plurality of applications comprise an instant messaging program.

12. The system of claim 7, wherein said plurality of applications comprise a document editing program.

13. A computer program product, comprising:
a non-transitory computer readable medium, said non-transitory computer readable medium having program code stored thereon, said program code comprising:
program code for obtaining data to be indexed from each of a plurality of applications, wherein said obtaining includes receiving a plurality of documents pushed by individual ones of a plurality of applications through an application programming interface of a shared search service;
program code for indexing said data into a shared search index of said secure, shared search service, wherein said indexing includes storing, for each one of said documents pushed through said application programming interface, in an entry representing said document in an application table within said shared search index, a tag identifying which one of said applications pushed said document through said application specific programming interface, and wherein said indexing further includes storing, for each word in said data, in an index entry for said word, an indication of an entry in said application table representing one of said documents containing said word, and wherein said shared search index is shared across said plurality of applications and a plurality of users;
program code for receiving a search query from one of said users;
program code for obtaining, responsive to said search query and said index entries, unfiltered initial search results including all documents matching said search query;
program code for storing said initial search results prior to displaying any of said initial search results;
program code for determining, prior to displaying any of said initial search results, and responsive to said initial search results, said index entries and said document table in said shared search index, for each document in said initial search results, which one of said plurality of applications pushed said document through said application programming interface of said shared search service;
program code for organizing documents in said initial search results, prior to displaying any of said initial search results, into groups reflecting which of said plurality of applications pushed each document through said application programming interface of said shared search service;
program code for determining, for each document in said initial search results, prior to displaying any of said initial search results, one of a plurality of security filtering modules registered by a corresponding one of said plurality of applications that pushed said document through said application programming interface of said shared search service to be indexed;
program code for applying, prior to displaying any of said initial search results, security filtering modules registered by individual ones of said plurality of applications that pushed said documents in said initial search results through said application programming interface to said initial search results to obtain filtered search results, wherein said applying includes said security filtering modules removing documents from said initial search results to which said one of said users does not have access, and performs application specific security filtering on a document by document basis within said initial search results by individually applying individual ones of said security filtering modules to only those documents of said initial search results pushed through said application programming interface of said search service by corresponding ones of said applications that registered said security filtering modules; and
program code for displaying said filtered search results.

14. The computer program product of claim 13, said program code further comprising:
program code for storing credential mapping information regarding said one of said users, wherein said credential mapping information maps said one of said users to application specific authentication credentials for one of said applications;
wherein said program code for applying said security filtering modules further comprises program code for retrieving said application specific authentication credentials, responsive to said credential mapping information, by one of said security filtering modules corresponding to said one of said applications; and
wherein said program code for applying said security filtering modules further comprises program code for determining which documents obtained from said one of said applications to which said one of said users does not have access responsive to said application specific authentication credentials.

15. The computer program product of claim 14, said program code further comprising:
program code for registering security filtering modules for each of said applications when each of said applications are installed.

16. The computer program product of claim 13, wherein said plurality of applications comprise an electronic mail program.

17. The computer program product of claim 13, wherein said plurality of applications comprise an instant messaging program.

18. The computer program product of claim 13, wherein said plurality of applications comprise a document editing program.

* * * * *